UNITED STATES PATENT OFFICE.

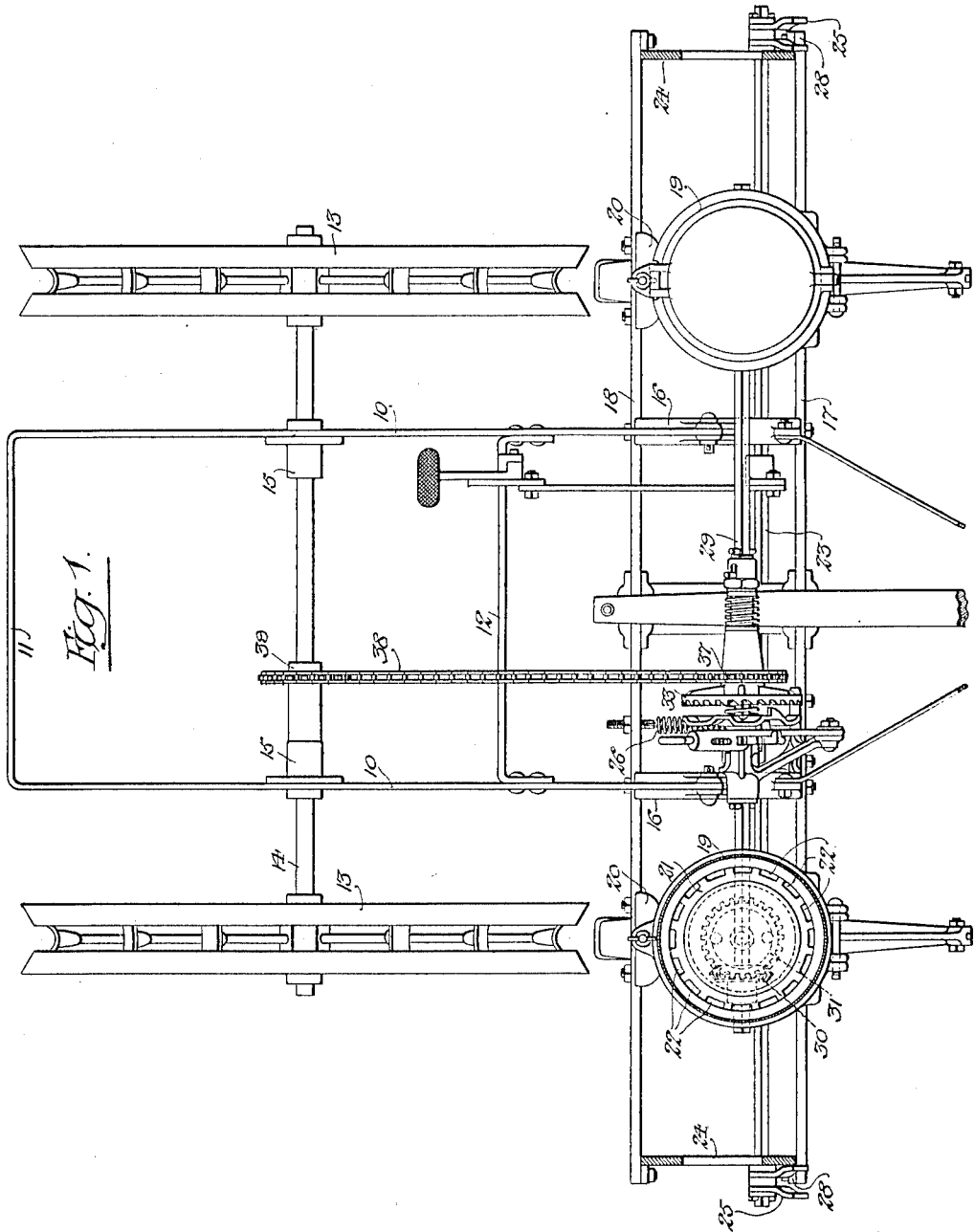

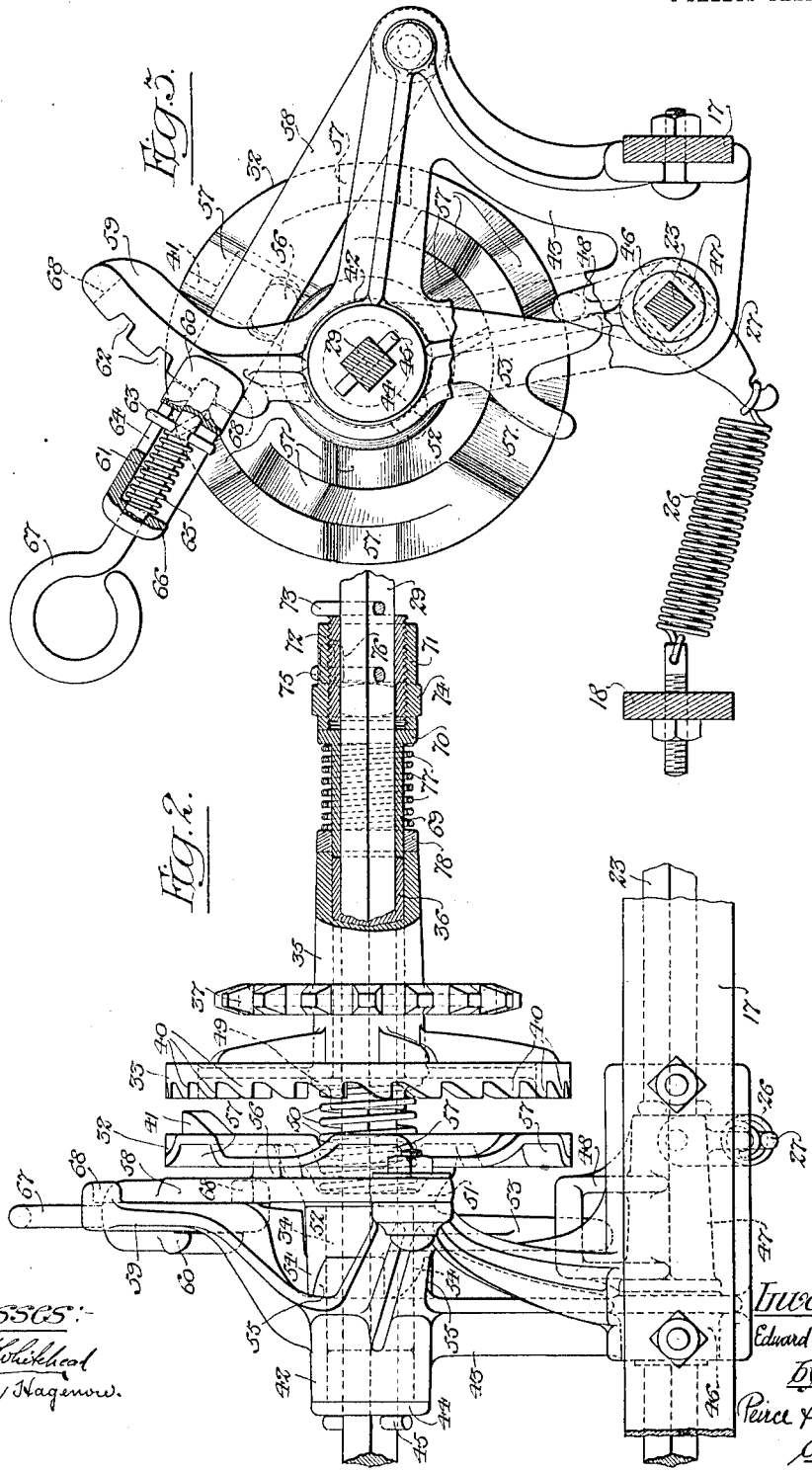

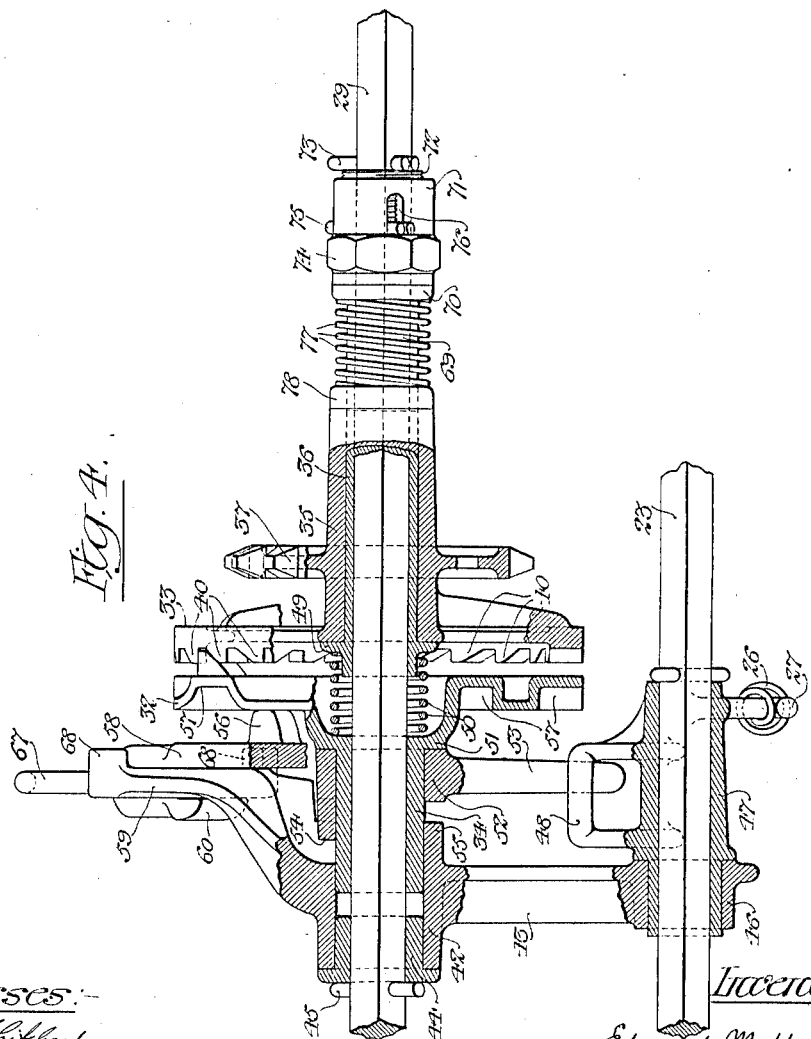

EDWARD M. HEYLMAN, OF JANESVILLE, WISCONSIN, ASSIGNOR TO THE JANESVILLE MACHINE COMPANY, OF JANESVILLE, WISCONSIN, A CORPORATION.

DRIVE MECHANISM FOR PLANTERS.

1,040,676.     Specification of Letters Patent.     Patented Oct. 8, 1912.

Application filed April 8, 1909. Serial No. 488,559.

*To all whom it may concern:*

Be it known that I, EDWARD M. HEYLMAN, a citizen of the United States, and a resident of Janesville, county of Rock, and State of Wisconsin, have invented certain new and useful Improvements in Drive Mechanism for Planters, of which the following is a specification.

The invention relates to corn planters, and more particularly to the clutch controlled, operating mechanism therefor and seeks to provide a simple and efficient form of variable clutch mechanism which can be adjusted without stopping the machine or changing the seed plates to effect the deposit of different numbers of seeds in the hills in accordance with the varying conditions of the soil.

The invention consists in the features of improvement hereinafter set forth, illustrated in the accompanying drawings and more particularly pointed out in the appended claims.

In the drawings, Figure 1 is a plan view of a corn planter with the present improvement applied thereto; Fig. 2 is a view in front elevation of the improved clutch mechanism for the planter with parts shown in central, longitudinal section; Fig. 3 is a side elevation thereof with certain parts broken away and with parts shown in cross section; Fig. 4 is a view of the improved clutch mechanism with the main part thereof shown in central longitudinal section; Fig. 5 is a detail view of the controlling cam arm for the clutch mechanism with parts shown in section.

The planter comprises a main frame formed of side bars 10 that are connected at their rear by a cross bar 11 and adjacent their front ends by a cross bar 12. The supporting wheels 13 are fixed to the ends of a wheel axle 14 that is journaled in suitable bearings 15 on the side bars 10 of the main frame. The forward ends of the side-bars 10 are pivoted to transverse brackets 16 which extend between the front and rear bars 17 and 18 of the front runner frame. Seed cans or hoppers 19 are mounted as usual upon supports 20 on the front runner frame and in front of the supporting and covering wheels 13. Seed plates 21 in the bottoms of these cans are provided with cells 22 by which the kernels are delivered, one at a time, to the valves in the boot (not shown) of the planter. A check row rock shaft 23 is journaled in the front runner frame and at its ends in cross pieces 24 extending between the front and rear bars 17 and 18. Forks 25 upon the ends of the shaft 23 are arranged to be engaged by knots on a check row wire in the usual manner to trip the boot valves of the planter and thereby deposit the accumulated seed at the hills. A spring 26 connected to an arm 27 on the check row rock shaft and to the rear bar 18 of the front runner frame, normally holds the shaft in position with the forks 25 against stops 28. The parts thus far described, may be of any usual or suitable construction.

A seed-plate operating shaft 29 is journaled on the front runner frame and carries at each end a beveled gear 30 for driving the adjacent seed-plate 21 through the medium of a beveled gear 31. The seed-plate operating shaft 29 is driven from the wheel axle 14 through the medium of the improved clutch mechanism.

This clutch mechanism comprises two clutch disks 32 and 33 that are mounted upon the seed-plate operating shaft 29. This shaft, in the form shown, is square in section and the clutch disk 32 is "tight" thereon or is connected to rotate therewith, while the clutch disk 33 is "loose" or is free to rotate independently in the shaft. In the form shown, the hub 34 of the clutch disk 32 is provided with a square opening which fits the shaft 29, while the hub 35 on the clutch disk 33 is loosely mounted to rotate on a sleeve 36 that fits on the shaft. A sprocket wheel 37 is formed upon the hub 35 of the clutch disk 33 and a drive chain 38 passes over this sprocket wheel and over a sprocket wheel 39 that is fixed to the wheel axle 14. The clutch disk 33 is thus continuously rotated during the forward travel of the machine. This disk is provided with a series of ratchet teeth 40 on one of its side faces. The clutch disk 32 is shiftable longitudinally on the shaft and is provided with a dog or tooth 41 which is arranged to engage the teeth 40 of the clutch disk 33 to couple the latter to the shaft 29 and thereby rotate the shaft and the seed plates geared thereto.

The outer end of the hub 34 of the clutch disk 32 extends within a bearing 42 on a bracket 43 that is fixed to the front bar 17 of the runner frame. A flanged sleeve 44 fitted on the shaft extends within the outer end of the bearing 42 and is held in place by a cross pin 45 extending through the shaft. The bracket 43 is also provided with a bearing 46 within which extends one end of a sleeve 47 fitted on the check row rock shaft 23. This sleeve carries the arm 27 to which the spring 26 is connected and is also provided with an arm 48 of inverted U-shape for controlling the clutch as hereinafter set forth.

The sleeve 36 on the seed-plate operating shaft 29 is provided at its inner end with a shoulder 49 and a heavy spring 50 coiled about the shaft extends between this shoulder and the end of the hub 34 of the clutch disk 32 and normally holds the latter in disengaged position, as shown in Figs. 1 and 2 with the tooth or dog 41 out of engagement with the ratchet teeth 40 of the clutch disk 33. The face of the clutch disk 32 is preferably recessed, as shown most clearly in Fig. 4, to receive the spring 50 and its hub is provided with a shoulder 51 against which bears the hub 52 of a cam arm 53. The hub 52 is loosely mounted on the hub 34 and is provided on its outer edge with a series of cam lugs 54 (see Figs. 2 and 5) which coöperate with cam lugs 55 (see Fig. 2) formed upon the inner end of the bearing 42 of the fixed bracket 43. The arm 53 is arranged to be engaged by the U-shaped arm 48 on the check row rock shaft and when the latter is rocked, the cam arm is oscillated and the engagement of the lugs 54 thereon with the fixed cam lugs 55 forces the cam arm and the clutch disk 32 along the shaft and against the pressure of the spring 50 into the engaged position shown in Fig. 4.

The clutch members are held in engagement by a normally fixed abutment or lug 56 which is arranged to engage the outer face of the clutch disk 32. This face of the clutch disk is provided with a plurality of circular rows of seats or depressions 57 into which the lug 56 enters when the clutch disk 32 is in its disengaged position. In the particular form shown, there are three rows of seats 57 with six in the outer row, four in the intermediate row and three in the inner row. As shown, some of the seats of the intermediate row are in line with some of the seats or depressions in the inner and outer rows. The lug or abutment 56 is adjustable into line with any one of the rows of seats 57, and for this purpose, is preferably mounted upon an arm 58 that is pivoted at its forward end to a forwardly projecting portion of the bracket 53. From its pivot, the arm 58 extends upwardly and rearwardly on one side of an upwardly projecting segment 59 formed on the bracket 43. The arm is provided with an enlarged inner end having a lip 60 thereon which extends over the segment 59. The enlarged inner end of the arm is cored out to receive a dog 61 that is guided to shift longitudinally therein into and out of engagement with a series of notches 62 formed in the segment 59. The dog or latch 61 is held against rotary movement by a pin 63 extending therethrough and engaging a slot 64 formed in the end of the arm 58. A spring 65 coiled about the dog extends between the pin 63 and a shoulder 66 on the end of the arm and tends to force the dog or latch into engagement with one of the notches 62. The projecting end of the dog or latch is provided with an eye or handle 67 by which the operator may withdraw the dog and shift the arm 58 to bring the lug 56 thereon into line with any one of the rows of seats 57. Stop lugs 68 upon the ends of the segment 59 limit the movement of the arm.

In operation, the clutch disk 33 is continuously rotated, while the clutch disk 32 and seed-plate operating shaft 29 are intermittently rotated. In the idle or disengaged position of the clutch disk 32, the lug 56 engages one of the recesses 57 in the face thereof. When a knot on a check row wire engages one of the forks on the check row rock shaft 23, the shaft is rocked and the clutch disk 32 is thrown into engagement with the clutch disk 33 as described. It is then rotated so that the lug 56 bears on the raised face of the clutch disk 32 intermediate the seats or depressions 57, so that the clutch members are held in engagement after the check row rock shaft has been returned to its normal position by the spring 26. The clutch disk 32 will then be held in engaged position until the next recess or seat 57 reaches the lug 56. The spring 50 will then return the clutch disk to its disengaged position.

As stated, the lug 56 may be adjusted into line with any one of the rows of seats, so that, with the particular construction shown, the seed-plate operating shaft 29 can be rotated through one-sixth, one-quarter or one-third of a revolution at each operation. In the form shown, the seed-plate 21 has sixteen seed cells and the ratio of the gearing between it and the shaft 29 is as three to four, so that the seed-plate can be rotated through one-eighth, three sixteenths or one-fourth of a revolution at each operation and two, three or four kernels can be planted in each hill. The adjustment of the lug or abutment 56 necessary to change the number of seed planted in each hill, can be readily effected without stopping the machine.

It should be noted that the lug or abutment 56 which controls the extent of revolution of the clutch mechanism is normally locked in position and is only movable so as to bring it into line with any one of the rows of seats 57. It should be also noted that the cam arm 53 positively shifts the clutch disk 32 to engaged position.

To prevent breaking of the parts, in case the dog 41 should engage the end of one of the ratchet teeth 40, the clutch disk 33 is yieldingly held in position against the shoulder 49 on the sleeve 36 as hereinafter described. The sleeve 36 on the shaft 29 is held by the spring 50 against a sleeve 69 on the shaft. One end of the sleeve 69 engages the sleeve 36 and its opposite end is provided with a flange 70 that is engaged by an adjusting collar 71. This collar is threaded upon a sleeve 72 that fits the shaft and is held in position thereon by a pin 73 extending through the shaft and engaging the end of the sleeve. The collar 71 is provided with a hexagonal portion to receive a wrench by which it may be adjusted. The sleeve is locked in adjusted position by a pin 75 that extends through the shaft 29, the sleeve 72 and slots 76 in the collar.

A spring 77 coiled about the sleeve 69 extends between the flange 70 thereon and a washer 78 that bears upon the end of the hub 35 of the loose clutch disk 33. This spring serves to yieldingly hold the loose clutch disk against the collar 49 on the sleeve 36. If the tooth 41 strikes the end of one of the ratchet teeth 40 when the shiftable clutch disk 32 is moved toward the loose clutch disk 33, the latter will yield to prevent breaking and to permit the proper engagement of the dog and teeth. By adjusting the sleeve 71, the collar 36 and the loose clutch disk 33 thereon may be adjusted toward the shiftable clutch disk 32 and thereby compensate for any wear upon the clutch disks and upon the parts that control the shift of the clutch disk 32.

It is obvious that numerous changes may be made in the details set forth without departure from the essentials of the invention.

I claim as my invention:—

1. In drive mechanism for planters, the combination with a shaft, of a pair of clutch members on said shaft, one of which is movable into and out of engagement with the other, said shiftable clutch member having a plurality of rows of seats in its outer face with a different number in each row, a normally fixed abutment arranged to enter said seats and to engage the face of said shiftable clutch member for holding it in engaged position, said abutment being adjustable into line with any one of said rows of seats, and devices independent of said abutment for moving said shiftable clutch member to engaged position, substantially as described.

2. In drive mechanism for corn planters, the combination with a shaft, of a pair of clutch members on said shaft, one of which is movable into and out of engagement with the other, said shiftable clutch member having a plurality of rows of seats in its outer face with a different number in each row, a pivoted arm having a lug thereon arranged to enter said seats and to engage the face of said shiftable clutch member for holding it in engaged position, means for adjustably locking said arm in position with said lug in line with any one of said rows of seats, a spring normally holding said shiftable clutch member in disengaged position, and devices independent of said adjustable arm for moving said shiftable clutch member to engaged position, substantially as described.

3. In drive mechanism for planters, the combination with a shaft, of a pair of clutch members on said shaft, one of which is movable into and out of engagement with the other, said shiftable clutch member having a plurality of rows of seats in its outer face with a different number in each row, a normally fixed abutment arranged to enter said seats, and to engage the face of said shiftable clutch member to hold it in engaged position, said abutment being adjustable into line with any one of said rows of seats, a spring for holding said shiftable clutch member in disengaged position, a shoulder on said shaft, a spring for yieldingly holding the other clutch member against said shoulder, and devices independent of said abutment for positively moving said shiftable clutch member to engaged position, substantially as described.

4. In drive mechanism for planters, the combination with a shaft, of a pair of clutch members on said shaft, one of which is movable into and out of engagement with the other, said shiftable clutch member having a plurality of rows of seats in its outer face with a different number in each row, a pivoted arm having a lug thereon arranged to enter said seats and to engage the face of said shiftable clutch member for holding it in engaged position, means for adjustably locking said arm in position with said lug in line with any one of said rows of seats, a shoulder on said shaft, a spring for holding said shiftable clutch member in disengaged position, a spring for yieldingly holding the other clutch member in position, a cam on said shaft and independent of said pivoted arm for positively moving said shiftable clutch member to engaged position, and devices for operating said cam, substantially as described.

5. In drive mechanism for planters, the combination with operating shaft, of a clutch disk loose on said shaft and geared to said wheel axle, a second clutch disk connected to rotate with said shaft but shiftable thereon into and out of engagement with said loose clutch disk, said shiftable clutch